Patented Feb. 13, 1951

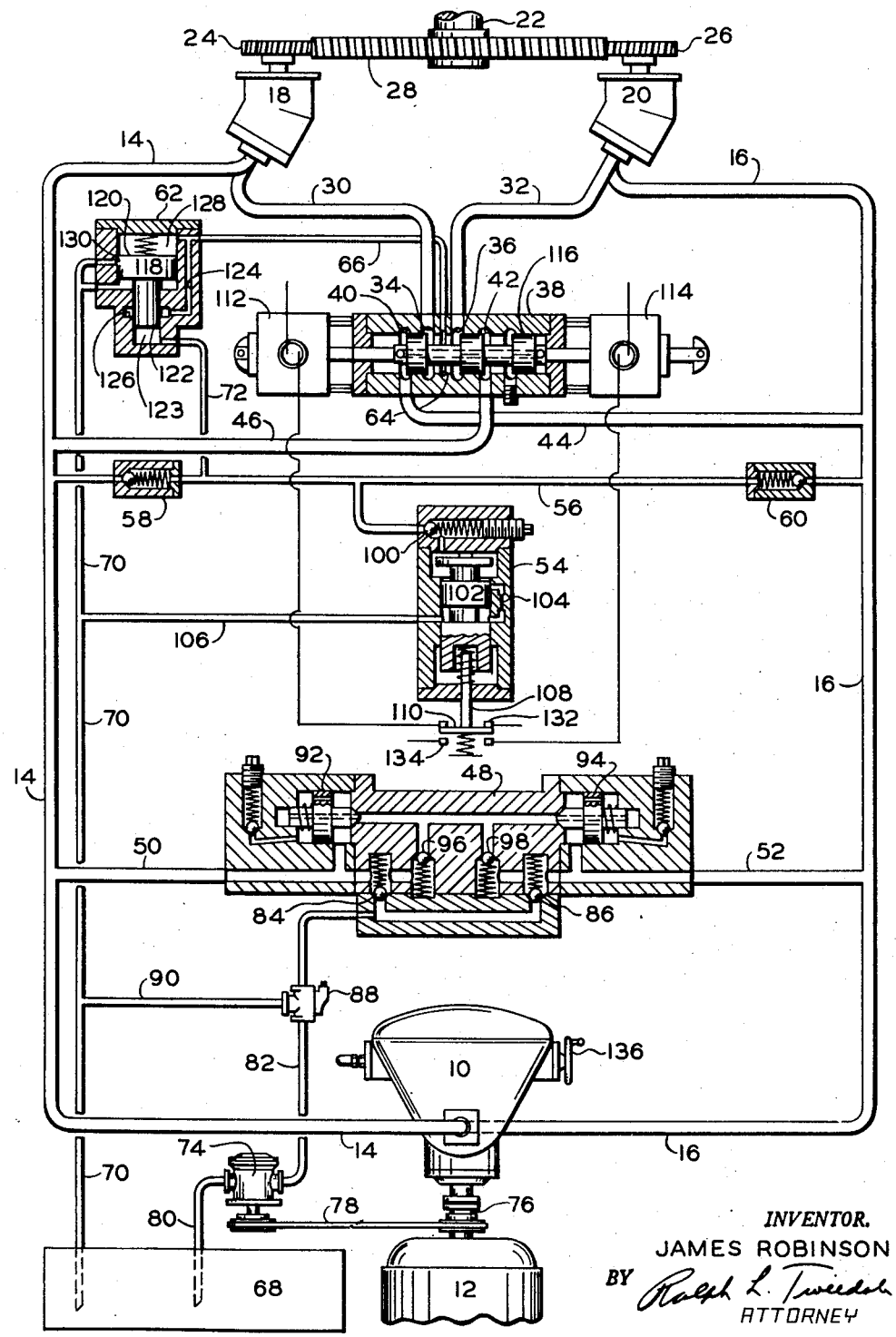

2,541,290

UNITED STATES PATENT OFFICE 2,541,290

HYDRAULIC POWER TRANSMISSION SYSTEM

James Robinson, Huntington Woods, Mich., assignor to Vickers Incorporated, Detroit, Mich., a corporation of Michigan Application August 30, 1946, Serial No. 693,986

6 Claims. (Cl. 60—53)

This invention relates to power transmissions, particularly to those of the type comprising two or more fluid pressure energy translating devices, one of which may function as a pump and another as a fluid motor.

This invention is particularly concerned with hydraulic transmissions having load characteristics requiring high torques at slow starting speed and lower torques at higher speeds. One of the inherent operating characteristics of hydraulic motors is that the torque output is inversely proportioned to the speed of rotation under constant power input. Due to the high torque starting requirement of certain load devices, the size of the hydraulic motor required to meet the demands may be impractical or uneconomical to manufacture. At the same time, the high speed low torque range of the transmission can easily be met by a standard, small high speed motor.

It is therefore the main object of this invention to employ the natural advantages of the small standard high speed low torque motor in a transmission in such a manner as to produce satisfactory high torque starting characteristics at lower speeds.

By gearing two or more motors to the load device, the sum of their torques can be used as a single force. By connecting the motors in parallel, the pump volume is divided between them thus decreasing their speed in proportion to the number of motors employed and increasing their combined low speed high torque delivery. If the same motors are connected in series, each receives the entire pump capacity resulting in high speed low torque characteristics as required under normal operating conditions in the case mentioned above.

Therefore, one of the objects of this invention is to provide means for connecting multiple motors in parallel during high torque starting speed and automatically shift the connections for series operation at normal operating speeds.

Another object is to provide means for automatically maintaining equal loads on all transmission motors connected in series.

Further objects and advantages of the present invention will be apparent from the following description, reference being had to the accompanying drawing wherein a preferred form of the present invention is clearly shown.

In the drawing:

The single figure is a diagrammatic view of a power transmission system incorporating a preferred form of the present invention.

The transmission includes a reverse flow variable delivery pump 10 driven by a prime mover 12 and connected by alternately pressure or return conduits 14 and 16 to hydraulic motors 18 and 20 which in turn are adapted to drive a load shaft 22 through motor pinions 24 and 26 and load shaft gear 28. Intermediate conduits 30 and 32 connect the motors 18 and 20 to ports 34 and 36, respectively, of a four-way valve 38. Pressure and return conduits 14 and 16 are connected to ports 42 and 40 of the four-way valve 38 by conduits 46 and 44, respectively. A double acting relief valve 48 is connected to conduits 14 and 16 across the pump 10 by conduits 50 and 52. A pressure switch 54 is connected to the pressure and return conduits 14 and 16 by means of the conduit 56 provided with check valve 58 and 60. A pressure dividing valve 62 is connected to port 64 of the four-way valve 38 by conduit 66, to tank 68 by tank conduit 70 and to pressure conduit 56 by conduit 72.

A replenishing pump 74 is illustrated driven off the prime mover shaft 76 by a belt 78 and adapted to suck hydraulic fluid from tank 68 by conduit 80 and replenish the system through the conduit 82 and check valves 84 and 86 to conduits 50 and 52. A relief valve 88 in conduit 82 is connected to the tank conduit 70 by conduit 90. The double acting relief valve 48 comprises two pressure balanced piston control valves 92 and 94 in combination with check valves 96 and 98 for relieving excess pressure in either pressure conduit 14 or 16 to the other conduit.

The pressure switch 54 comprises a ball resistance valve 100, piston 102, restricted by-pass 104 and discharge conduit 106. The push rod 108 is shown connected to a two-position switch 110 adapted to connect the solenoids 112 and 114 to a power source for shifting the four-way valve spool 116. The pressure dividing valve 62 includes a piston valve 118 provided with differential areas 120 and 122 and adapted to selectively connect conduit 66 to 72 by passage 124 and port 126, or to tank conduit 70 through chamber 128 and port 130.

In operation, pressure fluid is delivered by pump 10 to conduit 14. The transmission elements are illustrated in the drawing in their normal high speed or series operating position. The path of the pressure fluid in series operation is from pump 10 to conduit 14, first stage motor 18, conduits 30, ports 34 and 36 of the four-way valve 38, conduit 32, second stage motor 20, conduit 16, and return to the pump.

With the valve spool 116 in its series position as shown, port 64 is in communication with ports 34 and 36 and the intermediate conduits 30 and 32 are connected through conduit 66 to the pressure dividing valve 62 and chamber 128. The differential piston area 120 of the twin motor circuit illustrated is approximately twice the size of the piston area 122. Theoretically, assuming two motors of equal displacement, the pump operating pressure of 2,000 pounds per square inch, the pressure in the intermediate conduits 30 and 32 in series operation should be approximately 1,000 pounds per square inch in order to impose equal loads on each motor. If the pressure in the intermediate conduit 30 and 32 rises above the 1,000 pounds per square inch, then the force on piston area 120 will be greater than the force on area 122. The piston 118 will be shifted to open the chamber 128 to the tank port 130 thereby relieving the excess intermediate pressure through port 64 in the four-way valve 38 and conduit 66.

If the pressure in conduit 30 and 32 is below normal (1,000 p. s. i.), the pump operating pressure (2,000 p. s. i.) will be admitted from conduit 14 through check valve 58, conduit 72 to chamber 123 and the smaller piston surface 122. If the pressure on the surface 120 is below normal (less than 1,000 p. s. i.), the piston 118 will rise, uncover port 126 and by-pass the pump pressure fluid from chamber 120 through 123 through passage 124, conduit 66, ports 64, 34, and 36 into intermediate conduits 30 and 32. Thus, the inlet pressure of the second stage motor will be raised to normal and equalize the load on the motor.

A transmission employing three motors in series would be provided with two pressure dividing valves, one connected to the intermediate conduit between the first and second stage and one between the second and third. In order to equalize the load between the three motors of the same displacement, the pressure between the first and second stage would be two-thirds of the pump pressure and between the second and third stage, it would be one-third the pump pressure. The areas of the pressure dividing valve piston would be in the ratio of three to two for the first intermediate conduit and three to one for the second.

When the torque loads are heavy as occur during the starting period, the pump pressure will increase until the four-way valve shifts and connects the motors in parallel. That is accomplished when operating pressure fluid passes the resistance valve 100 and forces the piston valve 102 and rod 108 downward. This in turn throws the switch blade 110 and closes the lower pair of contacts 134.

Closing of the contacts 134 energizes the solenoid 114 which in turn shifts the spool 116 to the left. In that position, the motor discharge conduit 30 and port 34 are connected through port 40 and conduit 44 directly to the pump conduit 16. At the same time, motor 20, inlet conduit 32, and port 36 are connected by port 42 and conduit 46 directly to the pump conduit 14. Thus, closing of the contacts 134 shifts the operation from series to parallel.

In order to reverse the direction of rotation of shaft 22, the pump yoke is shifted by control wheel 136. Thus, conduits 14 and 16 may perform the function of either pressure or return conduits, respectively. All other elements of the transmission are designed and connected to function uniformly regardless of the direction of flow or rotation.

It will thus be seen that the present invention has provided a transmission for producing high starting torques and lower operating torque at normal speed without sacrificing efficiency. This is accomplished by employing multiple hydraulic motors with novel controls adapted to automatically connect the motors in parallel during low starting speed when the torque load is high, and automatically shift the connection to series and maintain equal loads on all motors during normal operation.

While the form of embodiment of the invention as herein disclosed constitutes a preferred form, it is to be understood that other forms might be adopted, all coming within the scope of the claims which follow.

What is claimed is as follows:

1. A hydraulic power transmission employing multiple motors geared to a power take-off and connected to an operating pressure fluid supply, including a four-way valve adapted to connect the motors in parallel or series, and pressure actuated control means for selectively shifting the four-way valve to connect the motors in series when the operating pressure is low and in parallel when the operating pressure is high.

2. A hydraulic transmission of the type employing a variable delivery, reversible flow pump connected to alternate pressure and return conduits, and multiple reversible motors geared to a load device comprising a four-way valve controlled by the operating pressure from the pump and adapted to connect the motors in series when the operating pressure is low, and in parallel at high operating pressures.

3. A control device for hydraulic transmissions employing a variable delivery, reversible flow pump connected by conduits to multiple, reversible motors coupled to a load device and adapted for selective series or parallel operation including a four-way valve for connecting the conduits and motors in series when the pump pressure is low, and pressure controlled means for shifting the four-way valve and connecting the conduits and motors in parallel when the pump pressure reaches a predetermined amount.

4. A control device for hydraulic transmissions employing a variable delivery, reversible flow pump connected by conduits to multiple, reversible motors coupled to a load device and adapted for selective series or parallel operation including a pressure dividing valve for maintaining a predetermined pressure in an intermediate conduit which connects consecutive motors when operating in series, including a differential piston valve controlled by the differential pressure between the intermediate conduit and the pump delivery conduit whereby excess pressure in the intermediate conduit will be ported to tank, and pump delivery pressure will be admitted to the intermediate conduit when its operating pressure is below normal.

5. A control device for hydraulic transmissions employing a variable delivery, reversible flow pump connected by conduits to multiple, reversible motors coupled to a load device and adapted for selective series or parallel operation including a four-way valve for connecting the conduits and motors in series when the pump pressure is low, and pressure controlled means for shifting the four-way valve and connecting the conduits and motors in parallel when the pump pressure reaches a predetermined amount, and a relief valve connected to the pressure and return conduits in parallel with the pump and adapted to relieve excess pressure in one conduit by exhausting into the other.

6. A control device for hydraulic transmissions employing a variable delivery, reversible flow pump connected by conduits to multiple reversible motors of equal displacement and coupled to a load device and adapted for selective series or parallel operation including a four-way valve for connecting the conduits and motors in series when the pump pressure is low, and pressure controlled means for shifting the four-way valve and connecting the conduits and motors in parallel when the pump pressure reaches a pre-determined amount.

JAMES ROBINSON.

REFERENCES CITED

The following references are of record in the file of this patent:

UNITED STATES PATENTS

| Number | Name | Date |
| --- | --- | --- |
| 2,079,268 | Wiedmann | May 4, 1937 |

FOREIGN PATENTS

| Number | Country | Date |
| --- | --- | --- |
| 184,455 | Great Britain | Oct. 18, 1923 |